United States Patent

[11] 3,633,053

[72] Inventor Rex B. Peters
Concord, Calif.
[21] Appl. No. 47,272
[22] Filed June 18, 1970
[45] Patented Jan. 4, 1972
[73] Assignee Systron-Donner Corporation
Concord, Calif.

[54] VIBRATION TRANSDUCER
13 Claims, 3 Drawing Figs.

[52] U.S. Cl. ........................................... 310/15,
340/17, 73/71.2
[51] Int. Cl. ........................................ H02k 35/02
[50] Field of Search ............................ 310/15, 30,
14; 340/17; 73/71.2; 336/132, 30

[56] References Cited
UNITED STATES PATENTS

| | | | | |
|---|---|---|---|---|
| 3,100,292 | 8/1963 | Warner, Jr. et al. | | 340/17 |
| 3,259,769 | 7/1966 | Stott | | 310/15 X |
| 3,453,573 | 7/1969 | Kyle | | 310/15 X |
| 3,463,946 | 8/1969 | Zimmerman | | 310/15 |
| 3,504,320 | 3/1970 | Engdahl et al. | | 310/15 X |

Primary Examiner—D. F. Duggan
Attorney—Flehr, Hohbach, Test, Albritton & Herbert ABSTRACT: Vibration transducer having a sealed capsule secured concentrically to an integral soft iron pole piece. An elongate bar magnet is slidably mounted in the capsule and has substantially coincident magnetic and mechanical axes. Suitable means is mounted within the capsule and engages opposite ends of the bar magnet and serves to yieldably retain the bar magnet in a predetermined position within the capsule. The capsule is filled with gas. The capsule and bar magnet are formed in such a manner that there is provided a passage for the controlled flow of gas from one end of the magnet to the other end of the magnet as the magnet moves from its predetermined position. Electromagnetic coil means is provided for detecting the movement of the magnet within the capsule.

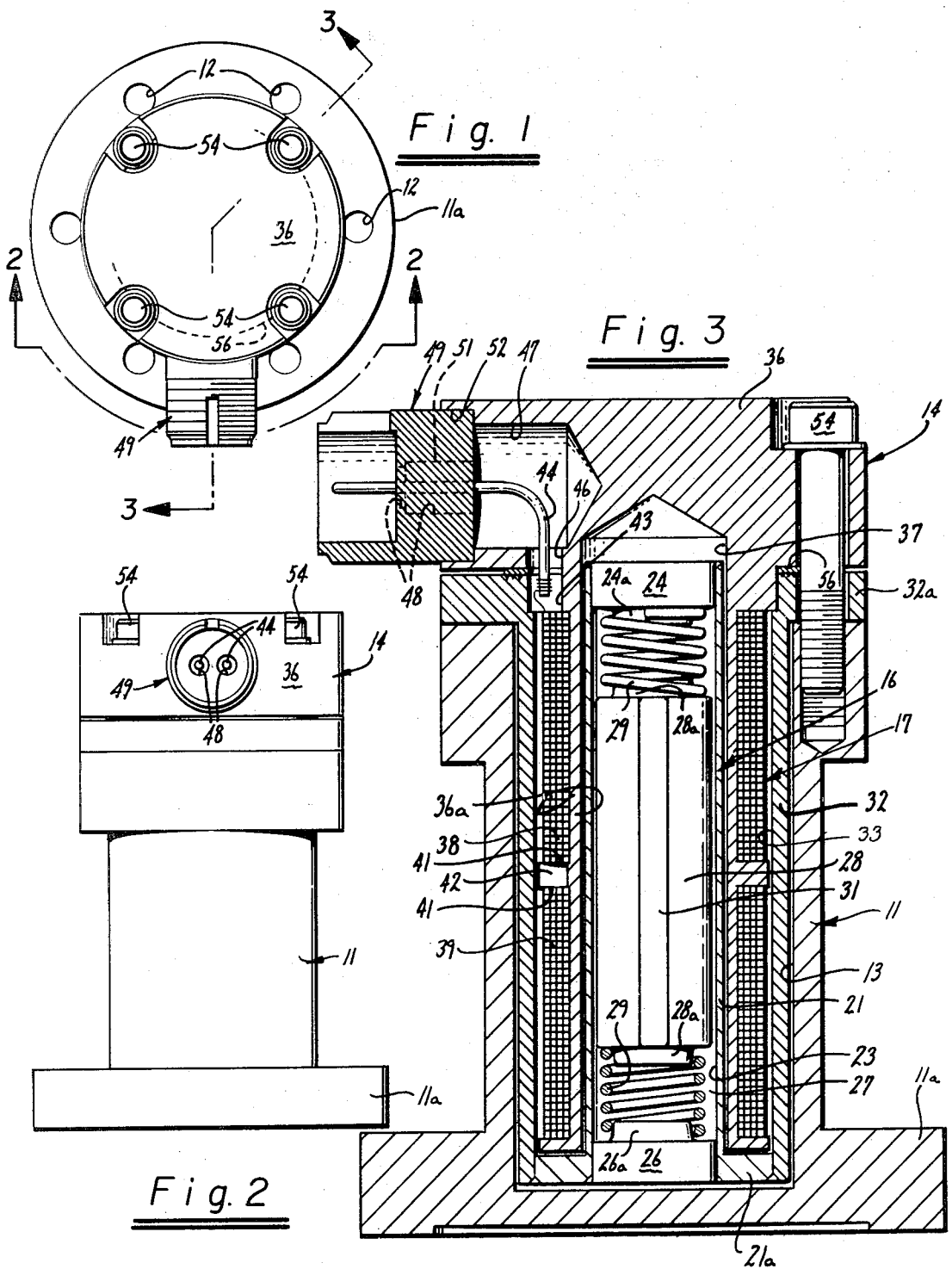

VIBRATION TRANSDUCER

BACKGROUND OF THE INVENTION

Vibration transducers have heretofore been provided which have been utilized sliding bar magnets. Such vibration transducers have been unsatisfactory because very high friction levels were encountered in such transducers which greatly limited their useful life. There is, therefore, a need for a new and improved vibration transducer.

SUMMARY OF THE INVENTION AND OBJECTS

The vibration transducer consists of a sealed capsule which has an elongated bore therefore, a need for a new and improved vibration transducer.

SUMMARY OF THE INVENTION AND OBJECTS

The vibration transducer consists of a sealed capsule which has an elongate bore therein. A cylindrical soft ion pole piece is secured to the capsule to become an integral part thereof. An elongate bar magnet is slidably mounted in the capsule. Yieldable means is mounted within the capsule and engages opposite ends of the bar magnet and serves to yieldably retain the bar magnet in a predetermined position in the bore in the capsule. The bore in the capsule is filled with gas. The capsule and the bore are formed in such a manner as to provide a passage from one end of the magnet to the other end of the magnet to permit a controlled flow of gas from one end of the magnet to the other end of the magnet as the magnet moves in the bore. An electromagnetic coil is provided for sensing movement of the magnet in the capsule.

In general, it is an object of the present invention to provide a vibration transducer which operates with accuracy and which has a long life.

Another object of the invention is to provide a transducer of the above character which is gas damped in such a manner as to obtain substantially linear damping.

Another object of the invention is to provide a transducer of the above character in which the magnet is precisely centered on the transducer axis.

Another object of the invention is to provide a transducer of the above character in which the magnet has substantially coincident magnetic and mechanical axes.

Another object of the invention is to provide a transducer of the above character in which the part in which the capsule containing the magnet can be readily replaced.

Another object of the invention is to provide a transducer of the above character which is a self-generating device.

Another object of the invention is to provide a transducer of the above character which has a relatively long life.

Another object of the invention is to provide a transducer of the above character which can be disassembled and reassembled without the necessity of realignment.

Additional objects and features of the invention will appear from the following description in which the preferred embodiment is set forth in detail in conjunction with the accompanying drawing.

BRIEF DESCRIPTION OF THE DRAWING

FIG. 1 is a top plan view of a vibration transducer incorporating the present invention.

FIG. 2 is a side elevational view looking along the line 2—2 of FIG. 1.

FIG. 3 is a cross-sectional view taken along the line 3—3 of FIG. 1.

DESCRIPTION OF THE PREFERRED EMBODIMENT

The vibration transducer shown in the drawings consists of a case 11 formed of a suitable material such as steel which is provided with a large flanged portion 11a at is lower extremity which has therein a plurality of holes 12 to permit the vibration transducer to be bolted to the object on which it is to measure vibration. The case 11 is provided with a large bore 13 which is adapted to receive a cap assembly 14. The cap assembly 14 carries a capsule assembly 16 and a coil assembly 17.

The capsule assembly 16 consists of an elongate open-ended cylindrical tube 21 which is provided with a radially extending flange portion 21a at one end of the same. The tube 21 is formed of suitable nonmagnetic material such as austenitic stainless steel. The tube 21 is provided with a cylindrical bore 23 which extends through the tube. Plugs 24 and 26 formed of a nonmagnetic material are mounted in the ends of the tube 21 and seal the ends of the tube so that a hermetically sealed chamber 27 is provided within the tube. The plugs 24 and 26 limit the magnetic circuit as hereinafter described. The plugs 24 and 26 are provided with inwardly extending bosslike portions 24a and 26a, respectively, which are centered with respect to the longitudinal axis of the bore 23. A cylindrical bar magnet is disposed within the bore 23 and is sized and is provided with a polished surface so that it can readily slide within the bore 23. In other words, there is not a tight fit between the magnet and the sidewalls of the tube 21.

Means is provided within the capsule for engaging opposite ends of the magnet 28 so that the magnet is yieldably retained in a predetermined longitudinal position within the tube 21. As can be seen, such means consists of a pair of coil springs 29 which engage the bosslike portions 24a and 26a of the end plugs 24 and 26, and similarly engage bosslike portions 28a provided on the ends of the bar magnet. The chamber 27 is filled with a dry gas such as a nitrogen during manufacture of the capsule assembly. This can be accomplished in a number of ways. For example, a hole can be drilled in one of the plugs 24 and the dry gas introduced through this hole and then the hole can be sealed. The tube 21 and the magnet 28 are formed in such a manner so that there is provided a passage which will permit the controlled flow of the gas from one end of the magnet to the other when the magnet shifts its position longitudinally of the bore 23.

Such means takes the form of a pair of flats 31 provided on the bar magnet 28 and extending the length thereof. The flats 31 are diametrically opposed for purposes of symmetry. The gas passages which are formed in this manner are so proportioned that substantially linear damping is obtained. The criteria for obtaining this linear damping are:

a. the gas passages must be sufficiently long so that the kinetic energy of the flowing gas is small, i.e., less than 10 percent compared to the friction losses in the passages.

b. the gas passages must produce a sufficiently small Reynolds number ranging from 0 to 3,000 to assure substantially laminar flow.

The bar magnet 28 can be formed of any suitable material. However, it is essential that the magnet axis and the mechanical axis of the bar magnet 28 be substantially coincident. By way of example, it has been found that Alnico 5 is a material which has sufficient uniformity for use in such a magnet so that the magnet axis is substantially coincident with the mechanical axis of the magnet.

Great care is taken in the manufacture of the parts which make up the capsule assembly 16. The end plugs 24 and 26 are also precisely positioned and are welded in place by suitable means such as electronic welding. A cylindrical sleeve 32 having an axially aligned bore 33 therein is provided and is formed of soft iron so that it can serve as a pole piece. The tube 21 is precisely positioned within the bore by a jig and then is welded to the cylindrical sleeve 32 by suitable means such as electron welding. As can be seen, the sleeve 32 is welded to the flange portion 21a of the tube 21. The sleeve 32 is also provided with a flange portion 32a. The sleeve 32 with the capsule assembly carried thereby is adapted to be seated within the bore 13 of the case 11 with the flange portion 32a resting on top of the case 11. For reasons hereinafter explained, it is very important that the bar magnet 28 be precisely centered along the longitudinal axis of the bore 33 within the tube 21.

The cap assembly 14 consists of a cap 36 formed of a suitable nonmagnetic material such as austenitic stainless steel. The cap 36 is provided with an elongate cylindrical extension 36a which is to fit within the sleeve 32. The extension 36a is provided with a large bore 37 which is adapted to receive the capsule assembly 16 carried by the sleeve 32. The cylindrical extension 36a carries electromagnetic coil means for sensing movement of the magnet longitudinally of the bore 23. The electromagnetic coil means consists of a pair of cylindrical windings 38 and 39 which are wound into recesses 41 provided in the cylindrical extension 36a. The windings 38 and 39 are formed of a suitable material such as insulated copper wire. As can be seen, the windings 38 and 39 encircle the cylindrical extension 36a and the capsule assembly 16.

The winding 38 and 39 are cylindrical and have a combined length which is substantially greater than the length of the magnet and, in fact, have a combined length which is great enough to accommodate the possible limits of travel of the magnet 28 and the fringing field created by the magnet. The magnet 28 itself has to be long enough so that the center of each of the windings is sufficiently removed from the end of the winding so that excessive amounts of the fringing field are not present in the other half of the winding when the magnet is at one extreme end of its travel.

The two windings 38 and 39 in fact form one coil and thus each serves as one-half of the coil. The two windings 38 and 39 are wound in opposite directions so that the outputs from the two halves will be additive. The two windings 38 and 39 are interconnected through a slot 42 extending between the two recesses 41. The ends of the wires of the windings 38 and 39 extend upwardly through the hole 43 provided in the flange portion 32a of the sleeve 32 and are secured to a pair of terminals 44. The terminals extend upwardly through a hole 46 provided in the cap 36 and into a large bore 47 also provided in the cap 36. The terminals 44 extend through holes 48 provided in the threaded connector 49. The terminals 44 are insulated from the connector 49 by a block 51 of insulating material mounted in the connector 49. The connector 49 is seated in a bore 52 provided in the cap 36.

The cap assembly 14 is secured to the case 11 by a plurality of capscrews 54. A seal ring or washer 56 is provided between the cap 36 and the flange portion 32a of the sleeve 32. It can be seen that the screws 54 secure the cap assembly 14, the sleeve 32 which carries the capsule assembly 16, and the case 11 into a unitary assembly.

Operation and use of the vibration transducer may now be briefly described as follows. Let it be assumed that the vibration transducer has been mounted in apparatus such as a jet engine in which it is desired to monitor vibration. This is accomplished by bolting the flange 11a of the case to the part on which vibration is to be monitored. Since the magnet has a mass, vibration of the case 11 will cause the magnet to shift back and forth or, in other words, move rectilinearly within the bore 23 against the yieldable force of the springs 29 by an amount which is directly proportional to the vibration which is being measured. As the magnet 28 shifts back and forth within the bore, the magnetic lines of force from each end of the magnet will cut the adjacent turns of the windings 38 and 39 to cause the generation of an electrical signal which represents the velocity of movement of the magnet within the bore. This velocity signal is converted from velocity to displacement by the use of electronics which performs an integration step. This displacement is then displayed on a meter or other suitable indicating means to give an indication of the vibration which is being measured. The output from the coils 38 and 39 has a very low electrical impedance with a relatively high signal level which permits the signal to be passed through long cables as, for example, from engine pods of jet engines on aircraft to the cockpit of the aircraft without providing additional electronics at the engine.

The construction of the vibration transducer is relatively simple and is formed of materials so that it can accommodate extremely high temperatures such as those which are encountered in the operation of jet engines.

It has been found that a vibration transducer constructed in the manner herein described has very little wear. This in part is due to the fact that substantially all of the cylindrical surface of the bar magnet 28, except for the flats 31, is used as a bearing surface and thereby reduces rattling contact stresses which could cause undesirable "brinelling" of the surface 23 of the tube 21. This reduction in wear is also due to the fact that very accurate concentricity has been obtained in the manufacture of the vibration transducer which minimizes any side loading on the magnet. In the event that the vibration transducer is mounted in its side, the side loading of the magnet against the sidewall of the tube in which it is travelling is 1 G. When the vibration transducer is mounted in a vertical position, it is believed that the side loading is not more than one-quarter G. This has been accomplished by the use of a number of features. For example, the magnet 28 is constructed in such a manner that the magnetic axis is as close as possible to the mechanical axis of the magnet. This ensures that there will be no substantial nonuniformity in the magnetic field which could cause side loading of the magnet against the tube in which it is travelling. A good return path has been provided for the magnetic fields by the soft iron pole piece in the form of the sleeve 32. All these parts are precisely centered with respect to each other so that the magnet 28 is automatically placed in the center of the magnetic pole piece structure so that in effect the magnet is in neutral equilibrium. In other words, the magnet is being attracted by equal forces in all directions to the magnetic pole piece structure forming the return path. This has the effect of reducing the friction to such a low level that it approximates a situation in which there is no magnetic pole piece structure surrounding the magnet.

The vibration transducer also has excellent characteristics because of the gas damping which is utilized. As pointed out previously, gas passages are provided which permit the control of the flow of gas from one end of the chamber to the other when the magnet moves within the chamber 27. The passages have been formed in such a manner that the damping is linear which makes it possible to obtain much more consistent low-frequency performance from the vibration transducer. The damping is, therefore, accomplished by air friction between the wall of the tube 21 and the flats 31 provided on the magnet 28.

The bosslike portions 28a and 26a are adapted to be engaged by the bosslike portion 28a provided on the magnet and in combination in addition to serving as a means for retaining the ends of the springs 29 serve as stops to prevent flattening of the coil springs 29 in the event of very severe vibrations being encountered by the vibration transducer.

The vibration transducer is constructed in such a manner that in the event if necessary to replace certain parts, it can be readily accomplished with a minimum of labor expense.

In the event for some reason it is desirable to replace the capsule assembly 16, this capsule assembly 16 which has a low labor content can be readily removed and replaced. Integration of the soft iron pole piece so that it forms a part of the capsule assembly 16 permits disassembly without breaking the magnetic circuit. This means that capsule assemblies can be removed and replaced without affecting calibration accuracy. This makes it possible to ship "precalibrated" capsules for replacement in the field where calibration facilities are not available.

It is apparent from the foregoing that there has been provided a vibration transducer which has many advantages. It is a self-generating device. It has low wear and can be readily disassembled and certain parts replaced. All parts which are required to be accurately concentric are contained in a single weldment, so that no special alignment is needed during field assembly.

I claim:

1. In a vibration transducer, a capsule assembly comprising a sealed capsule having an elongate bore therein, and a cylindrical soft iron pole piece secured to the capsule exterior of and substantially concentric with the capsule, said capsule including an elongate bar magnet formed solely of magnetic material slidably mounted in said capsule, yieldable means mounted within the capsule and engaging opposite ends of the bar magnet and serving to yieldably retain the bar magnet in a predetermined position within the capsule, a gas filling said capsule, said capsule and said magnet being formed to provide a gas passage therebetween to permit the controlled flow of gas from one end of the capsule to the other end of the capsule past the bar magnet, said gas passage extending only over a portion of the circumferences of the bar magnet, a case enclosing said capsule and electromagnetic coil means in said case for sensing movement of said bar magnet in said capsule.

2. A transducer as in claim 1 wherein said passage for the flow of gas is formed so that substantially linear damping of the magnet is obtained.

3. A transducer as in claim 1 wherein said electromagnetic coil means is in the form of a pair of windings with the windings wound in opposite directions so that their outputs are additive.

4. A transducer as in claim 3 wherein said electromagnetic coil means has a length which is greater than the length of the magnet and the extremes of travel of the magnet within the capsule.

5. A transducer as in claim 3 wherein said gas passage is formed by diametrically opposed recesses in said magnet.

6. A transducer as in claim 1 wherein said soft iron pole piece is secured to said capsule assembly.

7. A transducer as in claim 1 wherein said magnet and the capsule assembly containing the magnet are precisely centered with respect to each other so that side loading on the magnet is minimized.

8. In a vibration transducer, a case, a bore in said case, a sleeve of soft iron mounted in said bore and forming a pole piece, a tube carried by said sleeve and secured to said sleeve, said tube having a bore depending longitudinally thereof, a bar magnet formed solely of magnetic material slidably mounted in said bore, a pair of end plugs mounted in said tube and serving to seal said tube so that there is provided therein a hermetically sealed chamber, a gas filling said chamber, means engaging said end plugs and the ends of said magnet for yieldably retaining said magnet in a predetermined position in said bore, a cap carried by said case, said cap having a cylindrical extension having a bore therein receiving said tube and a coil wound on said cylindrical extension and encircling said tube, said tube and said magnet being formed so as to provide a gas passage therebetween from one end of the chamber to the other and extending over only a portion of the surface of the magnet to permit the flow of gas in a controlled manner from one end of the chamber to the other past the magnet.

9. A transducer as in claim 8 wherein said sleeve and said tube are precisely positioned with respect to each other so that the magnet is uniformly attracted to all parts of the same to thereby reduce the side loading on the magnet.

10. A transducer as in claim 8 wherein said coil has a length which is substantially greater than the magnet and the limits of travel of the magnet within the tube.

11. A transducer as in claim 10 wherein said coil is in the form of a pair of windings wound in opposite directions and which are connected to each other so that outputs from the same are additives.

12. A transducer as in claim 8 wherein the passages are formed by recesses formed on the magnet and extending longitudinally of the magnet.

13. A transducer as in claim 8 wherein said end plugs are provided with centered bosslike portions and wherein said magnet is also provided with centered bosslike portions on opposite ends of the same and wherein said means engaging the end plugs and the ends of the magnet comprises a pair of coil springs mounted on said bosslike portions of the end plugs and the bosslike portions of the magnets, said bosslike portions on said plugs and said magnets being adapted to engage each other and to serve as stops to prevent flattening of said coil springs.

* * * * *